Oct. 2, 1962  L. V. S. LE BLAN ETAL  3,056,301
MECHANICAL FILTER FOR ANALOGICAL CALCULATION
Filed June 24, 1959  2 Sheets-Sheet 1

INVENTORS
LOUIS V. S. LE BAN
JEAN C. C. RADIX
BY Pollard Johnston
Smyth & Robertson
ATTORNEYS Oct. 2, 1962 L. V. S. LE BLAN ETAL 3,056,301
MECHANICAL FILTER FOR ANALOGICAL CALCULATION
Filed June 24, 1959 2 Sheets-Sheet 2

INVENTORS
LOUIS V. S. LE BAN
JEAN C. C. RADIX
BY *Pollane, Johnston*
*Smythe & Robertson*
ATTORNEYS 3,056,301
MECHANICAL FILTER FOR ANALOGICAL
CALCULATION
Louis Victor Simon Le Blan and Jean Claude Charles
Radix, Paris, France, assignors to Societe Anonyme dite:
Societe Alsacienne de Constructions Mecaniques, Paris,
France, a corporation of France
Filed June 24, 1959, Ser. No. 822,635
Claims priority, application France July 9, 1958
2 Claims. (Cl. 74—1)

The present invention relates to a mechanical filter intended to be employed especially for analogical calculation and more especially for control devices for automatic firing, and in this respect it is chiefly intended to be used, for example in combination with a radar pursuit unit.

It is known that the information supplied by a radar pursuit unit consists of:

(a) a useful portion, the spectrum of which extends from zero frequency up to a certain frequency which is the upper limit of the "useful band" of the information, (b) noise signals which usually extend into any band:

(c) In order to eliminate the parasite information due to noise, it is advantageous to filter the rough signals and at first sight it is advisable for this purpose to employ a low-pass filter; but this solution is not the best in all cases since the low-pass filter introduces a troublesome delay in transmission. Especially in the particular case in which the noise energy is well concentrated in a very constant narrow frequency band and when the band to be eliminated is outside the useful band, it can be advantageous to employ a band-elimination filter. In the description which follows, it has been assumed that only the use of a low-pass filter is to be contemplated for the applications considered.

In the drawings accompanying the present specification:

Figure 1:
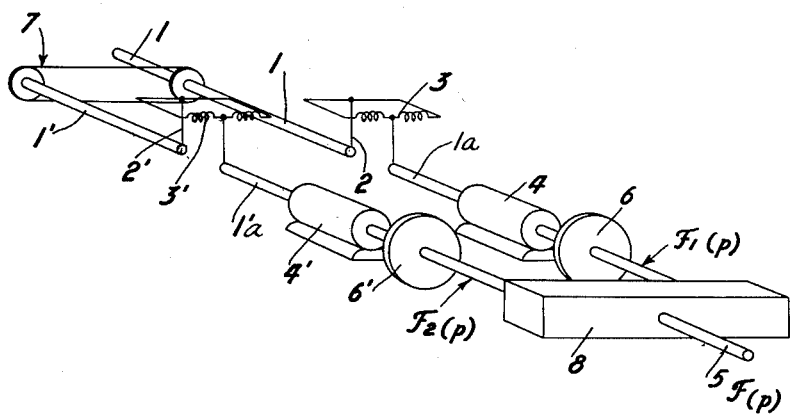
FIG. 1 is a mechanical filter designed in accordance with the present invention.

The most rudimentary filter system is that which has a transfer function as follows:

$$\frac{1}{1+pt}, p=\gamma\omega \qquad (1)$$

Simple time-constant filters of this type can be obtained either electrically or mechanically.

In order to sharpen their cut-off, electrical or mechanical systems can be employed, or so-called second order systems. In the instance of a purely mechanical embodiment (used when the quantity to be filtered is obtained in the form of the rotation of a shaft), one such mechanical system of the second order can, for example, comprise an elastic coupling, such as a spring, and an electric or hydraulic damping means, from which the filtered shaft of an inertia flywheel projects. The elastic coupling having the referenece C, the damping device F and the inertia I, the transfer function of the system is written as follows:

$$\left.\frac{C}{C+F_p+I_p^2}, \begin{matrix}C\\F\\I\end{matrix}\right\} > 0 \qquad (2)$$

which is the transfer function of the control system of the ordinary second order.

Unfortunately, the response curve systems, both of the phase and of the modulus type, vary as a function of the damping for a given pass-band and are not satisfactory. In particular, the retardation introduced by the filters appreciably affects the quality of an automatic fire control unit, if it is used to filter at any point the information intended for aiming.

Taking into account these various findings and observations, the applicants had the idea to produce a filter which gives on the one hand, a uniform modulus response curve having a cut-off remaining at least as sharp and on the other hand, a phase response comprising a distortion which leads to a delay which is relatively less considerable than in the case of known types of filters. The applicants have sought to produce a mechanical filter endowed with these features and which is more especially designed for use in control devices for automatic firing actuated for example by a radar pursuit unit.

Reverting to the above Formula 2, in order to obtain a nil transit time at zero frequency, it is usual and sufficient to cause a new term of $p$ to appear in the numerator.

This formula is easy to put into operation by means of passive and analogical mechanical devices. In order to obtain the desired result, that is to say in order to make use of the smaller portion of the filter pass-band, the applicants have had the idea to find a better definition for the transfer function starting from the transfer function of Equation 2, for example by means of a function $$H(p) = \frac{1+ap+bp^2}{1+ap+bp^2+cp^3+dp^4} \qquad (3)$$

such that $$H(p) = \alpha_1 H_1(p) + \alpha_2 H_2(p) \qquad (4)$$

in which $$H_1(p) = \frac{C_1}{C_1+F_1p+I_1p^2} \qquad (5)$$

$$H_2(p) = \frac{C^2}{C_2+F_2p+I_2p^2}$$

The conditions imposed on this transfer function imply a certain number of relations, not appearing in this specification, that depend on considerations proved accurate whether from the point of view of theory or practice.

Finally, the second suggested transfer function was obtained from the conditions $$\frac{\tau_2}{\tau_1}=2 \text{ and } \frac{\tau_3}{\tau_1}=1$$

These particular values have been considered satisfactory in the case in which it is desired to obtain a phase distortion likely to lead to a practically zero delay or in the vicinity of the 0 frequency. The available parameters would on the contrary make it feasible to obtain a particularly linear phase and a modulus response which is particularly uniform in the pass-band, if these conditions were better adapted to the problem considered.

Problems of this kind can arise in the case in which the delay is not troublesome in itself but in which the filter is required to eliminate noise or parasite signals without at the same time deforming the useful signal, for example in the case in which it is required to record a signal needed to study an apparatus.

More particularly, the invention relates to a mechanical filter designed especially for the automatic control of firing at targets effected by starting from radar signals, said filter comprising a geared coupling between the input shaft to be filtered and a secondary shaft preferably parallel to the input shaft, an elastic coupling inserted in the shaft to be filtered, an elastic coupling inserted in the secondary shaft, a damping and inertia unit mounted on an extended portion of the shaft to be filtered, a damping and inertia unit mounted on an extended portion of said secondary shaft, a differential device adapted to combine the outputs of said units, the output shaft of said differential device constituting said filtered shaft.

FIG. 1 represents a mechanical filter in accordance with the invention.

Figure 2:
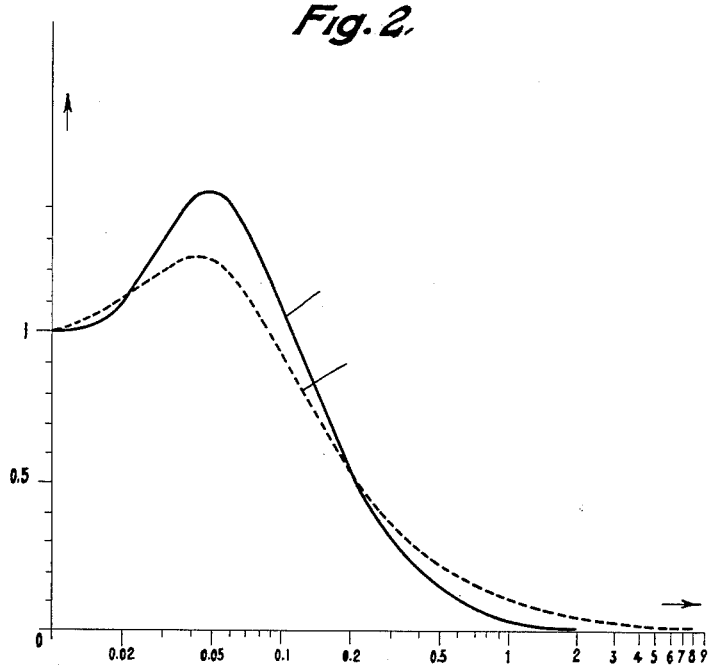
FIG. 2 represents the modulus curve of the type of filter shown in FIG. 1.
Figure 3:
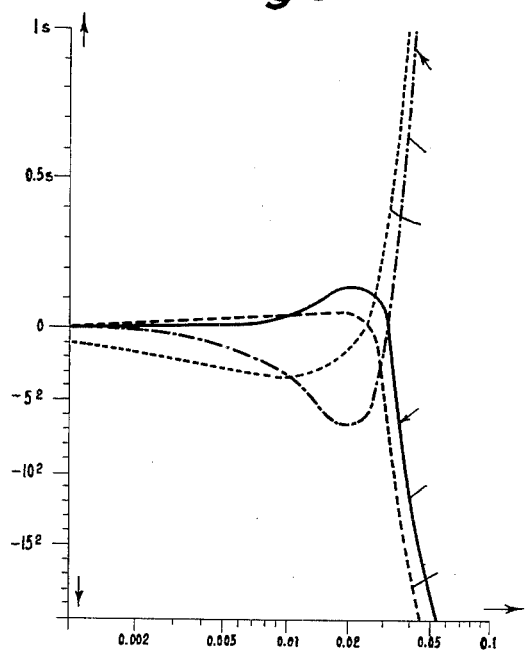
FIG. 3 represents the phase response curves of the type of filter shown in FIG. 1.

FIGS. 2 and 3 correspond to two filters in accordance with the invention of the type shown in FIG. 1.

In this filter, which combines two systems of the second order, the input shaft component 1 to be filtered is coupled by means of the gear-train 7 to the secondary shaft component 1'. In FIG. 1, only the two end elements, being toothed wheels, which actuate shaft components 1 and 1', are shown of the gear train. Shaft components 1 and 1' (respectively of the input and secondary shafts) are coupled by elastic couplings 2 and 2', respectively, to shaft components 1a and 1'a (respectively of the input and secondary shafts). The elastic couplings consist of springs 3 and 3'. Mounted on shaft components 1a and 1'a are hydraulic damping means 4 and 4', each of which is conventionally comprised of two concentric cylinders, one of which is rotatable and bathed in a thin layer of oil; and inertia devices 6 and 6', each comprising a flywheel. The shaft components 1a and 1'a engage at the outlet of inertia devices 6 and 6', a differential 8, the output shaft of which is the filtered shaft 5.

One of these filters, the characteristics of which are drawn in continuous lines, corresponds to the sum of the two filters of the following second order:

$$(\text{I}) \quad \frac{2}{1+jF+(jF)^2} - \frac{1}{1+2jF+(jF)^2}$$

The other filter, the characteristics of which are drawn in dotted lines, is a filter of the third order and the resultant of the three filters of the first order as follows:

$$(\text{II}) \quad \frac{3}{1+(2.5F)} + \frac{3}{1+j(5F)} + \frac{1}{1+j(7.5F)}$$

The filter I is acceptable since its gain bulge has a value of only 3 decibels.

The filter II is obtained by placing in parallel 3 simple transfer functions of the first order. The results obtained are more satisfactory than with system I, but its practical application requires that 3 shafts are placed in parallel instead of 2.

In any case, these filters give very interesting results from the point of view of transmission delays on a sine-wave component. In FIG. 3 at the top right of the diagram, the transmission delays are given for both systems. In the case of system I, this delay does not exceed 0.2 seconds for $$0 < F < 0.028 \text{ cycles}$$

If the filter had been of the linear phase type having a minimum transit time, the transit time would be constant and equal to its value for the cut-off frequency at —6 db, which is in this case 0.22 cycles. In the case of a filter of this type, the transit time is a half period of the cut-off frequency, namely:

$$\frac{1}{2 \times 0.22} = 2.27 \text{ seconds}$$

It can thus be seen that the present invention makes it possible in a relatively simple manner to produce filters having very small delays at the bottom of the pass-band. The determination of the constants of the elements constituting the filter of the higher order in accordance with the invention is easily effected, taking into account the frequencies employed, the general theory of filters and also the permissible delays.

It will be noted that in order to produce the desired results, it is advisable to provide efficient devices for taking-up play in the various gear trains and to ensure the stability of the damping devices. This latter condition necessitates regulation of the temperature of the fluid used, which is common practice, particularly in the case of floating gyroscopes.

The mechanical filter which has been described above is more particularly intended for automatic devices for firing control in modern systems of this type. But it will be understood that a filter of this type can be applied on every occasion when there appears an information which occupies a spectrum of very low frequency such as for example the spectrum encountered in a control device designed to control machine tools.

What we claim is:

1. In a mechanical filter system associated with the shaft of an automatic follow-up device for control of weapon fire, the combination including rotatable input shaft means for receiving an input to be filtered and secondary shaft means parallel to said input shaft means, said input and secondary shaft means each consisting of a plurality of components, one component of said input shaft means having a first extremity and a second extremity, one component of said secondary shaft means having a first extremity and a second extremity; transmission means for coupling said first extremity of said component of said input shaft means to said first extremity of said component of said secondary shaft means; a plurality of compound mechanical filters, each being a component of one of said shaft means, each having a different differential equation of motion at least equal to 1 and different filter characteristics, each of said filters having an input and an output side and each at its input side being connected to said second extremity of respective ones of said components; a rotatable filtered output shaft; and means coupling the output side of said filters to said output shaft.

2. In a mechanical filter system associated with the shaft of an automatic follow-up device for control of weapon fire directed by radar signals, the combination including rotatable input shaft means for receiving an input to be filtered and secondary shaft means parallel to said input shaft means, said input and secondary shaft means each consisting of a plurality of components; a transmission device coupling one extremity of a component of said input shaft means to the adjacent extremity of a component of said secondary shaft means; a plurality of filters, each being a component of one of said shaft means, each having an input and an output side, said filters being connected at their input side to the other extremity of respective ones of said two components, each of said filters including an elastic coupling, at least one damping device, and at least one inertia device, each of said filters having a different combined filter characteristic; a rotatable filtered output shaft; and a differential device coupling the output sides of said filters to said output shaft.

References Cited in the file of this patent

UNITED STATES PATENTS

| | | |
|---|---|---|
| 2,255,773 | Heftler | Sept. 16, 1941 |
| 2,480,946 | McDowal et al. | Sept. 6, 1949 |